United States Patent [19]

Thompson

[11] Patent Number: 4,725,551
[45] Date of Patent: Feb. 16, 1988

[54] RAPID LEAK DETECTION SYSTEM

[75] Inventor: Glenn M. Thompson, Tucson, Ariz.

[73] Assignee: Tracer Research Corporation, Tucson, Ariz.

[21] Appl. No.: 556,688

[22] Filed: Nov. 29, 1983

[51] Int. Cl.$^4$ .............................................. G01N 1/02
[52] U.S. Cl. ......................................... 436/3; 73/40.7; 436/56
[58] Field of Search ................. 73/40.7, 40.5 R, 49.2; 47/48.5, DIG. 4, DIG. 10; 422/70, 83; 436/3, 25, 27–30, 161, 56, 175

[56] References Cited

U.S. PATENT DOCUMENTS

| 3,174,329 | 3/1965 | Kauffman et al. | 73/40.7 |
| 3,837,228 | 9/1974 | Nemeth et al. | 73/40.7 |
| 4,189,938 | 2/1980 | Heim | 73/40.7 |
| 4,446,329 | 5/1984 | Waller | 585/458 |

FOREIGN PATENT DOCUMENTS

| 112282 | 1/1941 | Australia | 436/25 |
| 1804441 | 5/1970 | Fed. Rep. of Germany | 73/49.2 |
| 54-150195 | 11/1979 | Japan | 436/161 |
| 3815 | of 1912 | United Kingdom | 47/DIG. 4 |

OTHER PUBLICATIONS

Randall et al.; Suitability of Fluorocarbons as Tracers in Ground Water Resources Evaluation; Selected Water Resources Abstracts; PB277488; 11/77.
Ferber et al.; Demonstration of a Long-Range Tracer System Using Perfluorocarbons; National Technical Information Service; 1/81.

Primary Examiner—Barry S. Richman
Assistant Examiner—Michael S. Gzybowsky
Attorney, Agent, or Firm—Harry M. Weiss & Associates

[57] ABSTRACT

A method and apparatus for the rapid detection and pinpoint location of leaks in one or more of a plurality of subsurface fluid storage tanks. A quantity of tracer material such as a fluorinated halocarbon compound is mixed with fluids in each of the plurality of underground storage tanks. A first subsurface vapor pipe or conduit having an above-surface air inlet and a plurality of apertures therein is positioned in the backfill within the vicinity of the tanks and the above-surface inlet is used for conducting, drawing or sucking air into the air inlet pipe. A second subsurface sample or collection pipe having an above-surface pipe outlet and a plurality of apertures therein is also positioned in the vicinity of the tanks into the backfill. Air drawn down into the vapor pipe passes through the backfill and past a plurality of storage tanks and in close proximity thereto, and into the sample pipe. Any tracer which is leaking from the tank or tanks will be picked up and drawn into the sample pipe. The air in the sample pipe is tested for the presence of the tracer after water vapor is removed from the air sample.

71 Claims, 3 Drawing Figures

RAPID LEAK DETECTION SYSTEM

BACKGROUND OF THE INVENTION

This invention relates generally to a rapid leak detection apparatus and method for underground fluid systems and more particularly to an apparatus and method for the rapid detection and location of leaks from underground gasoline storage tanks.

It is standard in the oil industry to employ pressure tests, various types of still gauging, or liquid level measurements or to perform measurements of hydrocarbons in the subsurface to determine if a buried tank is leaking. Each of these conventional methods suffers significant practical shortcomings. The pressure tests are known to be insensitive and thus are not reliable. The still gauging methods require the tank to be filled with product to a point above ground where changes in liquid level are observed in a small diameter tube while monitoring for the product temperature to subtract thermal expansion or shrinkage effects. The major drawbacks to this method are inconvenience due to disruption of tank service for about twelve hours and the expense for testing and for the purchase of sufficient product to fill the potentially leaking tank.

The method of testing for hydrocarbons in the subsurface is known to be highly unreliable due partially to the fact that surface spills create relatively high subsurface product vapor concentrations. Thus the vapor detection method of leak sensing is seldom considered as reliable, let alone conclusive.

Once the presence or existence of a leak has been confirmed, the location of the leak is normally or typically determined by the time consuming and expensive process of excavating the entire area around the tank or by undertaking a time consuming soil sampling procedure. The sampling procedure requires soil coring at numerous potential leak locations followed by expensive laboratory analysis of the test soil cores for hydrocarbons.

The technique proposed herein offers a vastly more sensitive and faster tracer leak detector system that circumvents substantially all of the shortcomings and problems of the prior art.

SUMMARY OF THE INVENTION

It is the object of the present invention to provide an improved leak detection apparatus and method for use in conjunction with underground fluid systems.

It is a further object of the present invention to provide a leak detection apparatus and method for detecting fluid leaks from subsurface liquid storage tanks.

Still a further object of the present invention is to provide an improved leak detection apparatus and method for rapidly locating even small leaks in buried gasoline tanks.

Yet another object of the present invention is to provide a leak detection system and apparatus for use in conjunction with underground liquid storage tanks where a leak is suspected.

Still another object of the present invention is to provide a leak detection method and apparatus to use in conjunction with buried gasoline tanks which can be implemented in new or existing service stations without requiring tank removal or disrupting tank service.

Another object of this invention is to provide a method and apparatus for probing upgradient after a leak is detected to determine the relatively exact location of the leak.

It is yet a further object of the present invention to provide an improved gas chromatograph system for analyzing test samples for the presence of a tracer to indicate a leak in a subsurface tank. The improvement includes a Nafion tube water removal system operatively coupled to the gas chromatograph for removing water from the system prior to analyzing the sample for greatly improved results and sensitivity.

The present invention relates generally to an apparatus for detecting a leak from one or more subsurface fluid storage tanks. The fluid may include a liquid such as gasoline or the like, or a gas such as natural gas, methane, butane, propane, synthetic gasses, and the like. The apparatus has one or more subterranean, subsurface, or underground fluid storage tanks, each of which contains a fluid. Means are provided for mixing a quantity of the tracer with the fluid in the tank and at least one subsurface vapor or air inlet pipe is provided in the vicinity of the tank or tanks. Each such vapor pipe includes a plurality of apertures therein and a first end proximate the surface for drawing, pumping or forcing air into the vapor or air inlet pipe to the backfill or material surrounding the underground tanks. Another subsurface or underground sample pipe or pipes are provided, each having a plurality of apertures therein, and at least one of the sample pipes are positioned in the vicinity of the tank or tanks such that the air passing down through the vapor pipe to the sample pipe will be drawn past at least one of the tanks. A means is provided for drawing air from the vapor pipe or pipes past at least one of the tanks into the sample pipe and a second means is provided for analyzing the air drawn into the sample pipe for the presence of tracer indicating the detection of a leak in a given one of the tanks.

The fluid stored in the subsurface tank may be a liquid such as gasoline, or a gas such as natural gas, synthetic gas, methane, butane, propane, or the like. The tracer is normally a highly volatile organic tracer and the preferred tracer is the group of compounds known as fluorinated halocarbons which may be commonly referred to as halocarbons or fluorocarbons. Since high volatility and disfusability are desirable characteristics for tracers, the tracer list may also contain groups of tracers which include methanes, ethanes, and various other materials. Preferably, the tracer has a boiling point less than that of gasoline, although this is not necessary for the proper functioning of the apparatus of the present invention, and the boiling point range may be between minus 50 degrees centigrade and plus 80 degrees centigrade. The means for drawing air down the vapor pipe may include an air pump operatively coupled to the sample pipe, and if a plurality of subsurface storage tanks are used, different tracers can be placed in each of the different tanks so that after the air sample is drawn up the sample pipe, the detection of a particular tracer or tracers will pinpoint the particular tank that is leaking.

The present invention also contemplates a method for locating leaks in at least one or more subsurface fluid storage tanks. The method includes mixing a volatile tracer with the fluid in the tank or tanks and pumping air from a vapor pipe past the tank or tanks into a sample pipe or pipes and analyzing the air in the sample pipe for the presence of the tracer, indicative of the presence of a leak and an indication of which of the tanks is leaking. The method may further include probing the tracer plume if a leak is detected, and mixing a different tracer with the fluid in each of a plurality of different subsurface storage tanks so that the analyzing step can detect the presence of a leak and pinpoint the particular tank or tanks which are leaking. The method may also be used when the fluid is liquid such as gasoline, or gas such as natural gas, synthetic gas, methane, butane, propane, and the like. Furthermore, the method may be used with a tracer such as fluorinated halocarbons, known commonly as halocarbons or fluorocarbons, although tracers from the groups comprising methanes, ethanes, and certain other compounds, may also be used.

Other advantages and meritorious features of the present invention will be more fully understood from the following description of the drawings and the preferred embodiments, the appended claims, and the drawings which are briefly described hereinbelow.

DESCRIPTION OF THE PREFERRED EMBODIMENT

Figure 1:
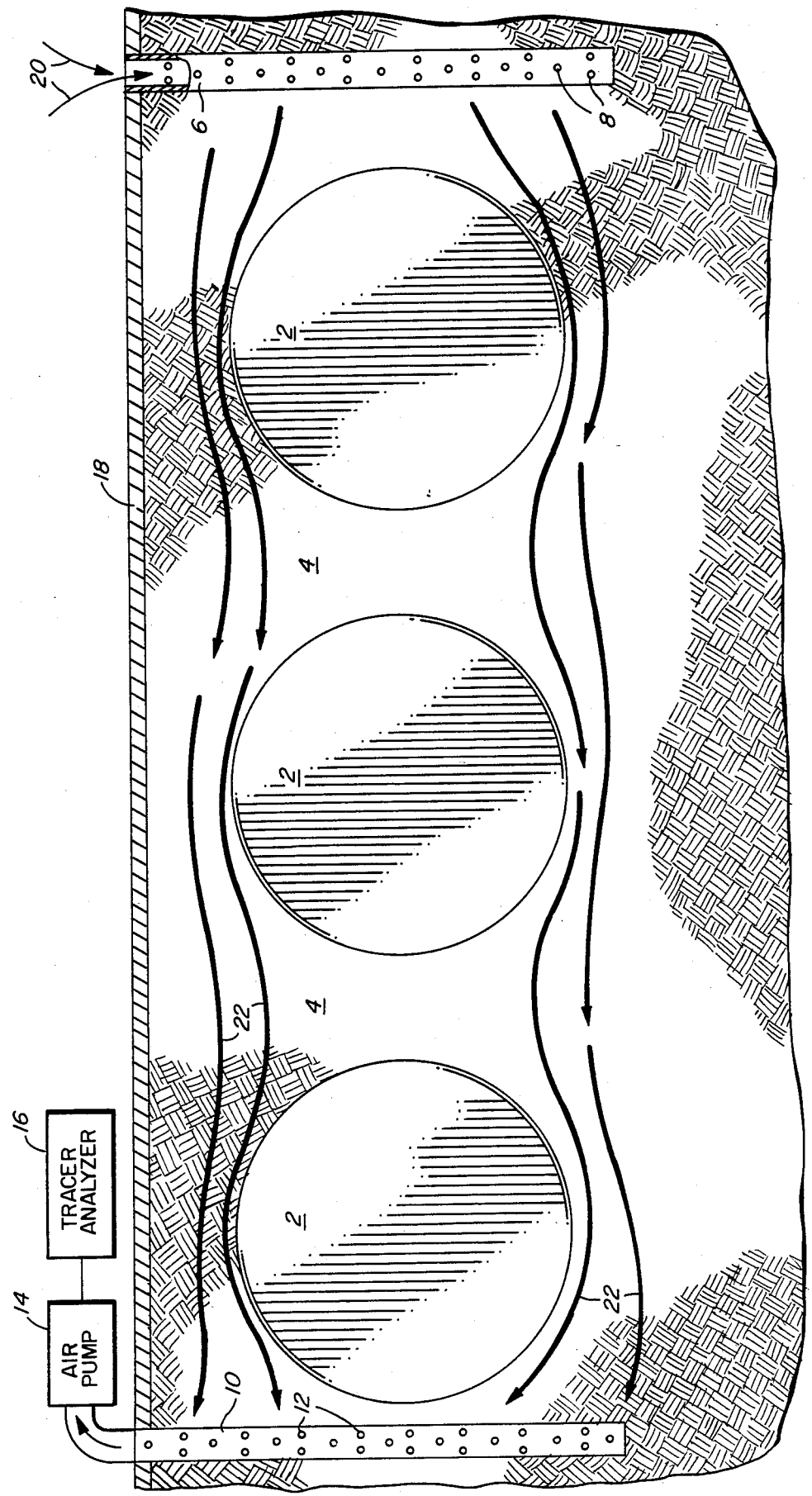
FIG. 1 is a cross-sectional functional diagram of the rapid leak detection system of the present invention.

Referring to FIG. 1 of the drawings, there is shown a plurality of underground fluid storage tanks 2 which may include a liquid such as gasoline or the like or a gas such as natural gas, synthetic gas, methane, butane, propane, and the like. Each of the tanks 2 is surrounded by backfill 4. Typically, backfill 4 is sand or gravel, since the use of sand or gravel prevents point pressures such as would be caused by large rocks against the underground tanks or pipes, although earth or the like could also be used. Furthermore, sand or gravel allows for better drainage around the tank structures and is conducive to air flow through the backfill, the importance of which will be described hereinbelow.

A subsurface vapor or air inlet pipe 6 or a plurality thereof along the length thereof having a plurality of perforations or apertures 8 is placed at one end of the overall underground tank structure on one side thereof, while a subsurface sample pipe or collection pipe 10 having a plurality of perforations or apertures 12 disposed substantially along its entire length is placed at the other end or opposite side of the tank structure. Sample pipe 10 has an upper outlet end operably disposed above the surface, and this upper outlet end is coupled to an air pump 14 having a pump output which is in turn coupled to the input of tracer analyzer 16. As can be seen, vapor pipe 6 has an upper end which extends through surface 18, such as the pavement, blacktop, or the like, so as to permit air to enter or be forceably drawn, pulled or injected into the vapor pipe 6 as indicated by arrows 20.

Each of the underground tanks 2 is spiked, injected or charged with a different and distinct tracer as enumerated hereinafter, and each tracer is preferbly a highly detectable volatile organic tracer such as a fluorinated halocarbon compound having a boiling point typically, but not necessarily, lower than the boiling point of the bulk of the gasoline or liquid in the tank. A tracer concentration in gasoline of approximately one hundred parts per million or 0.01 percent is required to insure detection of very small leaks. Approximately two liters of tracer are required to achieve this concentration in a full ten thousand gallon tank 2. The tracer must be thoroughly mixed with the liquid product (gasoline) and, therefore, it is best to add the tracer when the tank 2 is being filled; otherwise, a mixing or recirculating step must be implemented. After the gasoline has been spiked with the tracer and circulated through all of the underground pipes (not shown) for improved mixing, high-volume pumping of soil gas from the backfill is initiated by means of an air pump 14. The air drawn or forced down the vapor pipe and past the tank 2 is drawn up the sample pipe 10 by pump 14 and is monitored for the presence of tracers in the exhaust air which is provided to a tracer analyzer 16. Thus, presence of the tracer may be detected in the soil gas using gas chromatography techniques.

Figure 2:
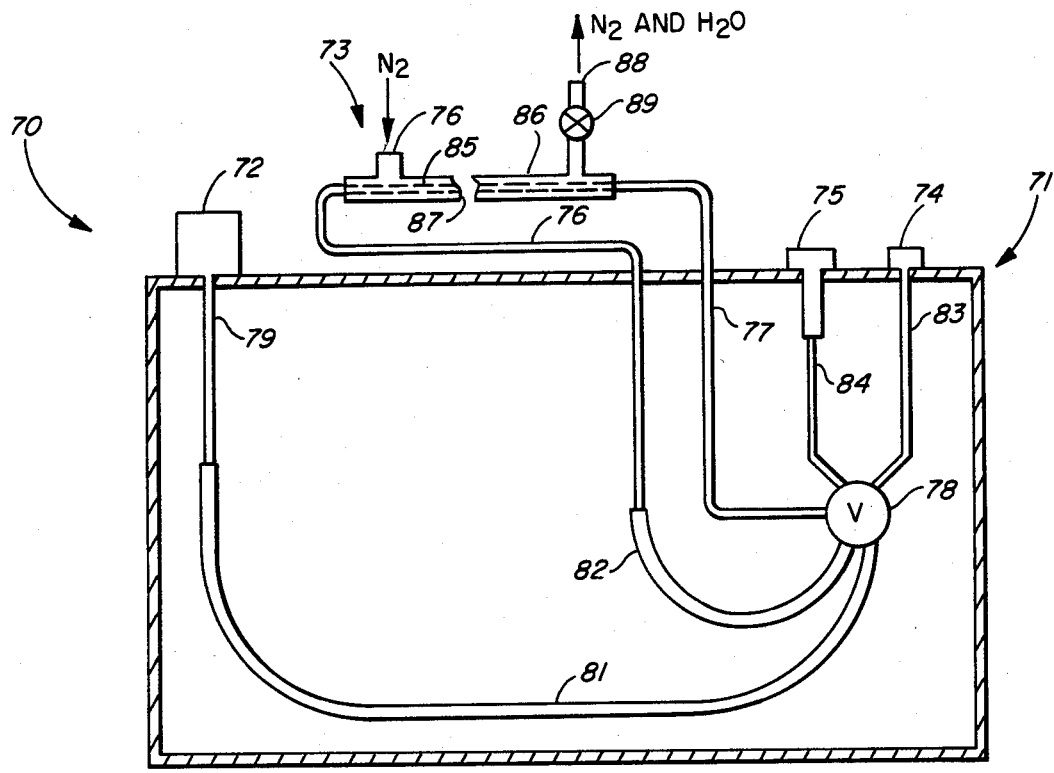
FIG. 2 is a cross-sectional diagram of the tracer analyzer of block 16 of FIG. 1.

FIG. 2 shows a cross-sectional diagram or schematic diagram of the tracer analyzer 70 of block 16 of FIG. 1. The tracer analyzer 70 shows a conventional gas chromatograph 71 having an electron capture detector 72 to sense and measure tracer and a Nafion tube water separator system 73 operatively coupled to the gas chromatograph 71. The gas chromatograph 71 includes a soil gas injection input or port 74, a standard injector inlet or port 75 for liquid gasoline or water injection, a pre-column re-input or inlet tube 76 to the gas chromatograph 71 from the output of the Nafion tube assembly 73, an outlet or outlet port 77 to the input of the Nafion tube assembly 73 from the gas sampling valve 78 of the gas chromatograph, and the analytical column output tube 79 from the analytical column 81 of the gas chromatograph 71 to the electron capture detector 72 to sense and measure any detectable quantity of tracer in the soil gas sample. The gas sampling valve 78 is also connected to the input of a pre-column 82 whose output is taken from tube 76 to the input of the Nafion water separator system 73. The soil gas injection inlet or port 74 is connected via tube 83 to the gas sampling valve 78, while the standard injector inlet or port 75 is connected via tube 84 to the gas sampling valve 78.

The outlet of the sampling valve 78 is taken via tube 77 to the input of the Nafion tube water separator system 73 of the present invention. The separator includes a ten to twenty foot length of Nafion tube having a mm O.D. Nafion tubing 85 enclosed or encased within a ten foot length or jacket of ¼ inch O.D. stainless steel tubing 86 or the like. Since the outside diameter of the inner tube 85 is substantially less than the inside diameter of the stainless steel tubing 86, an annular space or channel 87 is formed therebetween. The interior of the Nafion tubing 85 is continuous with the interior of the gas chromatographic analytical system 71 as previously described, since it is integral with the tube 76 and the tube 77 connecting the Nafion tube water separator system 73 to the gas chromatograph 71 of FIG. 2.

The sample of soil gas to be analyzed, and which may contain water or water vapor, is injected into the gas chromatograph 71 via the soil gas injection inlet or port 74 and supplied via tube 83 to the gas sampling valve 78. The sample of soil gas is then released or vaporized into a carrier gas stream such as nitrogen or the like, that sweeps it out of tube 77 in and through the interior of the Nafion tube water separator system 73. The specific structure and operation of the Nafion tube assembly 73 will be more clearly described in FIG. 3, but brief reference will be made to it herein. Because the Nafion tubing 85 is highly permeable to polar molecules such as water, and relatively impermeable to non-polar organic molecules such as the fluorocarbon tracer; the water or water vapor diffuses through the walls of the Nafion tube 85 in the separator 73 into the annular space 87. A nitrogen gas inlet port 96 feeds gas under pressure into the annular space 87 to form a carrier gas stream which sweeps the water vapor which diffuses through the walls of the Nafion tube 85 into the hollow annular space 87 to be carried by the carrier gas stream to the Nafion tube assembly outlet port 88. The outlet port 88 includes a valve 89 for selectively operating the system. The water or water vapor is thus removed from the soil gas sample to be analyzed, and the remainder of the sample continues to pass through the Nafion tubing 85 and through tube 76 to 82, and then to the gas sampling valve 78 to the analytical column 81 of the gas chromatograph 71. From there it passes via tube 79 to the electron capture detector, which senses and measures the amount of tracer present in the soil gas sample to indicate whether or not a leak exists, and the like.

Figure 3:
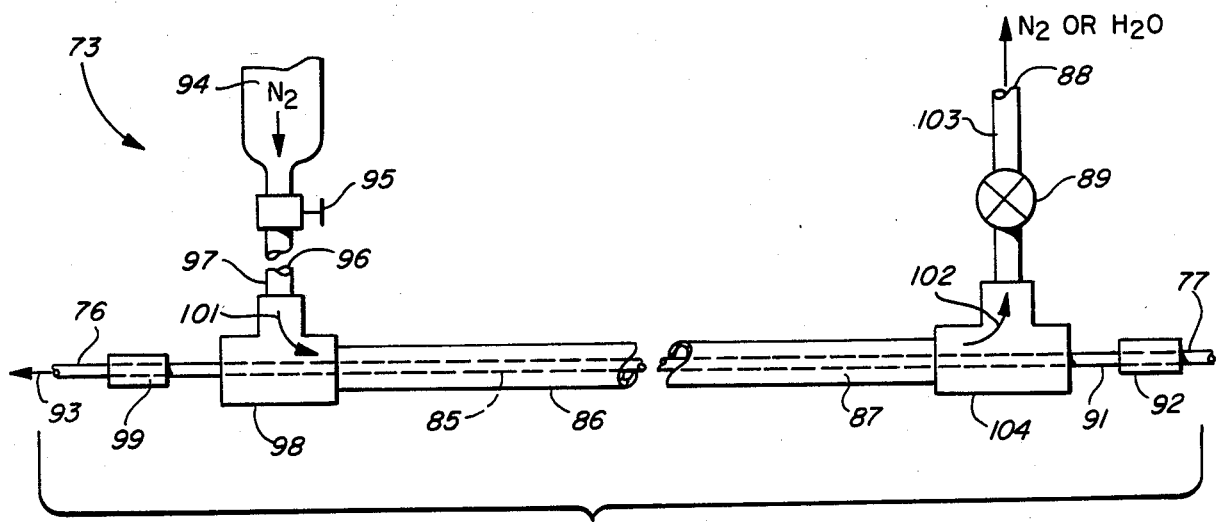
FIG. 3 is the Nafion tube water removal system of the tracer analyzer 16 of FIG. 2.

In FIG. 3, a schematic diagram of the Nafion tube water separator 73 of the present invention is shown. The Nafion tube 85 is surrounded, encased, or enclosed by a jacket 86 such as a stainless steel pipe, tube, casing, or the like, so as to create an annular space, channel, or passage between the outer surface of the generally cylindrical inner tube 85 and the inner surface of the jacket or pipe 86. The carrier gas from the gas chromatograph which contains the soil sample plus water vapor in vaporized form is supplied via tube 77 from the sampling valve 78 into the inlet of the Nafion tube water separator 73. The inlet includes a tube union or connection 92 for operatively connecting the tube 77 to the inlet 91 to the inner Nafion tube 85. As the carrier gas from the gas chromatograph which contains both the vaporized soil sample plus water vapor is carried in the gas stream through the Nafion tube 85 in the direction of the arrow 93, the water vapor diffuses through the walls of the Nafion tube 85 and enters the annular space or channel 86.

A source of pressurized gas, as indicated by the cylinder 94, is connected through a pressure regulator 95 to the jacket inlet 96. The inlet 96 is connected through an inlet tube 97 to a T-joint 98 having one opening adapted to sealably receive the inlet tube 97 therein, and an outlet threadedly secured to one end of the pipe 86. The opposite end of the T-joint is plugged with an aperture in the central portion thereof for passing the Nafion tube therethrough in a fluid-tight seal to the connector or union 99.

Therefore, when the gas enters the inlet 96 and passes through the pipe or tube 97 to the joint 98, it can only move in the direction given by the arrow 101, since the opposite end is plugged. The nitrogen then develops a stream of gas under pressure, which passes through the annular space 87 between the tube 85 and the jacket 86 to sweep away or clear out substantially all water vapor which is diffused through the outer walls of the inner tube 85 and entered the annular space 87. The carrier gas for sweeping the water vapor away continues in the direction of the arrow 102 through a T-joint or pipe fitting 104 at the opposite end of the steel pipe or jacket 86. The T-joint 104 has one end threadedly secured to the opposite end of the pipe 86, one end reduced in diameter for connection to an outlet tube 103 to outlet 88 for passing or outputting the nitrogen carrier gas together with the swept water vapor to a storage location, to the atmosphere, or the like. The opposite end of the T-fitting 104 is plugged except for a central aperture of the Nafion tube outlet 91 which connects to the inlet tube 77 via connector 92, as previously described.

Therefore, the Nafion tube receives the vaporized sample gas and water vapor through inlet tube 77 and the sample, devoid of water vapor, continues its flow in the direction of the arrow 93 until it exits the Nafion tube assembly 73 via outlet tube 76 to return back to the pre-column 82 of the gas chromatograph of FIG. 2. From there it passes through the gas sampling valve 78 and through the analytical column 81 and tube 79 to the electron capture detector 72 to sense and measure the amount of tracer present in the sample. Simultaneously, gas released from the gas cylinder 94 enters the annular space 87 and proceeds in the opposite direction to the flow within the Nafion tube 86, as indicated by arrows 101 and 102, to wash or sweep away the water vapor diffused from the Nafion tube into the annular space away from the sample and through outlet 88. The remaining vaporized sample, devoid of water vapor, is then fed back to the gas chromatograph of FIG. 2 to test for the presence of the tracer.

If the soil gas pumping is performed at one end of the backfill, normally through the collection of air sample pipe, and the air inlet is provided through the asphalt or pavement and into the backfill at the opposite end (as is shown in the drawing), an extremely rapid air flow through the backfill can be easily induced as represented by arrows 22, particularly if the backfill is gravel or sand. Tracer leaking from any point in any one or more of the plurality of tanks will quickly evaporate and be picked up by the air flow past the tank or tanks, resulting in the detection of the leak or leaks.

The system may use, and normally will use, a plurality of storage tanks and a plurality of different and distinct tracers so as to have a unique different and distinct tracer for each individual different and distinct storage tank. A plurality of vapor pipes or air inlet pipes may be disposed on substantially one side of the plurality of storage tanks with either a single collection pipe and pump on relatively the opposite side of the plurality of tanks, substantially opposite the plurality of air inlet pipes so the air from all inlet pipes is drawn or pumped to a single collection pipe or a plurality of collection pipes may be placed on the opposite side of the tanks from the air inlet pipes for better test coverage and more pumping power.

A tracer plume originating at the exact location of the leak will be established in the backfill by the time the tracer has been detected at the main observation point. This tracer plume can then be used to locate the exact location of the leak if the plume is probed up gradient to the leak. Probing the plume requires small (e.g., one-half to one-quarter inch diameter) holes drilled through pavement 18 into the backfill 4. Small soil gas samples are collected through the drilled holes enabling detection of the plume to be quickly established without significant additional plume dispersion. This tracking procedure is capable of identifying the exact location of the leak to within a few feet or less.

Furthermore, by using different and distinct tracers in each tank, it can be quickly determined exactly which tank or tanks are leaking. Many of the fluorinated halocarbon tracers available for use in a system such as the one described herein have very low toxicities. Most of them tested thus far carry the same underwriter's acute toxicity rating as carbon dioxide. Thus, the gasoline itself is much more poisonous than the potential tracers and the low toxicity will aid the acceptance of tracer use.

The tracers that appear most suitable for use in the present invention are fluorinated halocarbons, fluorocarbons and halocarbons. Since the high volatility and diffusability are the basic desirable characteristics for a good tracer, the tracer list will include primarily one or two carbon compounds. In order to select tracers with the lowest toxicity, fluorinated halocarbons and fluorocarbons are preferred. In fact, substantially all volatile halocarbons with good deteriorability are usable in the system of the present invention. Specific compounds having a very high probability of success for use as tracers include the following:

A. Methanes including:
  (1) chlorobromodifluoromethane;
  (2) trifluoroiodomethane;
  (3) trifluorobromomethane;
  (4) dibromodifluoromethane;
  (5) dichlorodifluoromethane; and
  (6) tetrafluoromethane;
B. Ethanes including:
  (1) dichlorotetrafluoroethane;
  (2) chloropentafluoroethane;
  (3) hexafluoroethane;
  (4) trichlorotrifluoroethane;
  (5) bromopentafluoroethane;
  (6) dibromotetrafluoroethane; and
  (7) tetrachlorodifluoroethane;
C. Others including:
  (1) sulferhexafluoride;
  (2) perfluorodecalin; and
  (3) perfluoro 1,3 dimethylcyclohexane.

In one test, a simulated leak of one milliliter of gasoline spiked or injected with 0.1 milligrams of tracer (i.e, one hundred milligrams per liter) was released into a vapor pipe or an inlet pipe 6 which penetrated eight feet into a corner of the backfill enclosing three gasoline storage tanks. The sample pipe was located diagonally across the backfill in the opposite corner approximately forty-one feet away. Air pumped from and through the backfill at a rate of approximately 89 cfm was allowed to enter the backfill at the vapor pipe 6 used for the gasoline injection. Samples were collected and analyzed approximately every ten minutes for both the fluorinated halocarbons, also called fluorocarbons or halocarbons, tracer and gasoline hydrocarbons. All measurements were made in the field by gas chromatography. No gasoline hydrocarbon components were detectable in this experiment. The peak concentration of the fluorocarbon or halocarbon tracer is 230 parts per trillion, approximately a factor of three greater than the tracer detection limit. The tracer was detected approximately sixty minutes after releasing the gasoline into the backfill and was substantially removed after 112 minutes of pumping. There was not detectable background for the tracer in the system prior to its introduction into the gasoline.

The above-described system offers greater sensitivity to slow leaks than do any and all existing standard methods. A leak of a few milliliters per day would be difficult if not impossible to detect by conventional methods unless the tank was put out of service for a long period of time, whereas the above-described method would detect such leaks quickly. Tracking the tracer plume can be performed quickly in the field by gas sampling through small diameter ports, holes or bores drilled or otherwise formed through the pavement or other surface material rather than requiring time consuming soil sampling followed by laboratory analysis. The holes are then probed upgradient to determine the exact location of the leak. A large variety of tracers may be used, as previously described, but they must not be found in gasoline or in the natural environment. This enables repeat testing of the same system or simultaneously testing of several times if the leak is known but the exact location of the source is not.

With this detailed description of the specific method and apparatus used to illustrate the preferred embodiment of the present invention and the various alternative embodiments in the operation thereof, it will be obvious to those skilled in the art that various modifications can be made in the system of the present invention without departing from the spirit and scope of the present invention, which is limited only by the appended claims.

I claim:

1. In an apparatus for detecting a leak from at least one of a plurality of subsurface fluid storage tanks containing fluids therein, having at least one of a plurality of subsurface fluid storage tanks surrounded by a backfill material, the improvement which comprises:
  volatile liquid phase tracer means for providing a gas phase detectable component in a fluid leak
  means for mixing a quantity of said liquid phase tracer means with the fluid in said at least one of a plurality of subsurface storage tanks;
  at least one subsurface vapor pipe in the vicinity of said at least one of a plurality of subsurface storage tanks, said vapor pipe having a plurality of apertures along a length thereof positioned within said backfill material and having a first exposed surface end for drawing air into said at least one subsurface vapor pipe;
  at least one subsurface sample pipe having a plurality of apertures along a length thereof positioned within said backfill material and a surface outlet, said at least one sample pipe positioned such that air passing from said at least one subsurface vapor pipe through the subsurface to said at least one subsurface sample pipe will be drawn in relatively close proximity past said at least one of a plurality of subsurface tanks;
  means for drawing air into said first surface end of said at least one subsurface vapor pipe, through said at least one subsurface vapor pipe and out said apertures into the subsurface area around said at least one of a plurality of subsurface fluid storage tanks, past said at least one subsurface tank and in relatively close proximity thereto thereby volatilizing leaking volatile liquid tracer means to a gas phase tracer means, and drawing said gas phase tracer means into said apertures of said at least one subsurface sample pipe and out of said sample pipe surface outlet; and
  means for analyzing said air drawn into said at least one subsurface sample pipe for the presence of said gas phase tracer means as an indication of a leak from the at least one subsurface tank.

2. The apparatus of claim 1 wherein the fluid in said at least one of a plurality of subsurface tanks is a liquid.

3. The apparatus of claim 1 wherein said means for analyzing the air drawn from said at least one sample pipe comprises a gas chromatograph and a tubular water separating means for removing water vapor from the sampled air drawn from the sample pipe prior to analysis by said gas chromatograph.

4. The apparatus of claim 3 wherein said tubular water separator means includes an elongated tube for receiving at one end thereof the air sample to be tested and for supplying at an opposite end thereof the air sample to be tested without any water vapor contained therein;
- an outer cylindrical jacket operably disposed around said elongated tube for defining an annular space between said elongated tube and an inside surface of walls of the jacket;
- said elongated tube being operative on an air sample containing water vapor passing therethrough for diffusing the water vapor through the walls of said elongated tube and into said annular space;
- an inlet to the annular space at the opposite end of said elongated tube and an outlet from the annular space at one opposite end of said elongated tube;
- means for supplying a pressurized stream of carrier gas through the inlet into the annular space for sweeping water vapor away as it diffuses through the walls of said elongated tube, said carrier stream containing removed water vapor being passed through the outlet at the at one opposite end of the jacket for removal from the system;
- means for transmitting the air sample within said elongated tube, and having water vapor removed therefrom, from said tube water separator means into said gas chromatograph for analysis thereof; and
- said gas chromatograph including means responsive to the analysis of the air sample, with water vapor removed, for detecting relatively small quantities of said tracer means therein for indicating a presence of a leak in said at least one of a plurality of subsurface tanks.

5. The apparatus of claim 1 wherein the fluid in said at least one of a plurality of subsurface tanks is gasoline.

6. The apparatus of claim 5 wherein said liquid phase tracer means is a fluorinated halocarbon compound having a boiling point less than that of gasoline.

7. The apparatus of claim 6 wherein said boiling point of said liquid phase tracer means is between minus fifty degrees centigrade and plus eighty degrees centigrade.

8. The apparatus of claim 1 wherein said liquid phase tracer means is a volatile organic tracer.

9. The apparatus of claim 8 wherein said air drawing means is an air pump coupled to said at least one subsurface sample pipe, at said surface outlet thereof.

10. The apparatus of claim 8 wherein said liquid phase tracer means is selected from the group consisting of fluorinated halocarbons, methanes, and ethanes.

11. The apparatus of claim 10 wherein said volatile liquid phase tracer means is selected from the group consisting of halogenated methanes, halogenated ethanes sulferhexafluoride, perfluorodecalin, and perfluoro 1,3 dimethylcyclohexane.

12. The apparatus of claim 11, wherein said tracer is a halogenated methane group liquid phase tracer means selected from the group consisting of chlorobromodifluoromethane, trifluroiodomethane, trifluorobromomethane, dibromodifluoromethane, dichlorodifluoromethane and tetrafluoromethane.

13. The apparatus of claim 11, wherein said tracer is a halogenated ethane group liquid phase tracer means selected from the group consisting of dichlorotetrafluoroethane, chloropentafluoroethane, hexafluoroethane, trichlorotrifluoroethane, bromopentafluoroethane, dibromotetrafluoroethane and tetrachlorodifluroethane.

14. A method for locating leaks from at least one of a plurality of subsurface fluid storage tanks buried in a backfill material surrounding each of the at least one of a plurality of subsurface fluid storage tanks, comprising:
- placing at least one of a plurality of vapor pipes in backfill material on one side of at least one of a plurality of subsurface fluid storage tanks which tanks are buried in said backfill material;
- placing at least one of a plurality of sample pipes in said backfill material on an opposite side of said at least one of a plurality of subsurface fluid storage tanks;
- mixing a volatile liquid phase tracer with fluid in said at least one of a plurality of subsurface fluid storage tanks;
- drawing air from said at least one of a plurality of vapor pipes past said at least one of a plurality of subsurface fluid storage tanks into said at least one of a plurality of sample pipes thereby volatilizing said liquid phase tracer which leaks from said at least one of a plurality of subsurface fluid storage tanks to a gas phase tracer and into said at least one of a plurality of sample pipes; and
- analyzing the air in said at least one of a plurality of sample pipes for the presence of said gas phase tracer for determining when a leak is present in at least one of said plurality of subsurface fluid storage tanks.

15. The method of claim 14 further comprising probing a tracer plume when a leak is detected.

16. The method of claim 14 wherein said liquid in said at least one of a plurality of subsurface fluid storage tanks is gasoline.

17. The method of claim 14 wherein said volatile liquid phase tracer is a fluorinated halocarbon compound having a boiling point lower than that of gasoline.

18. The method of claim 14 wherein said volatile liquid phase tracer is selected from the group consisting of fluorinated halocarbons, methanes, and ethanes.

19. The method of claim 14 wherein said step of mixing further comprises mixing said volatile liquid phase tracer with a portion of said fluid form said at least one of a plurality of subsurface fluid storage tanks and subsequently injecting said fluid-tracer mixture into said at least one of a plurality of subsurface tanks.

20. The method of claim 14 wherein said step of drawiang air from said at least one vapor pipe includes the step of pumping air from a surface outlet of said at least one sample pipe in order to draw air from a surface inlet of said at least one vapor pipe, through apertures of said at least one vapor pipe, past said at least one of a plurality of subsurface fluid storage tanks, into apertures of said at least one sample pipe, and up said at least one sample pipe to said surface outlet thereof for analyzing the air sample.

21. The method of claim 14 wherein said volatile liquid phase tracer is selected from the group consisting of halogenated methanes, halogenated ethanes, sulferhexafluoride, perfluorodecalin, and perfluoro 1,3 dimethylcyclohexane.

22. The method of claim 21, wherein said tracer is a halogenated methane group liquid phase tracer means selected from the group consisting of chlorobromodifluoromethane, trifluroiodomethane, trifluorobromomethane, dibromodifluoromethane, dichlorodifluoromethane and tetrafluoromethane.

23. The method of claim 21, wherein said tracer is a halogenated ethane group liquid phase tracer means selected from the group consisting of dichlorotetrafluoroethane, chloropentafluoroethane, hexafluoroethane, trichlorotrifluoroethane, bromopentafluoroethane, dibromotetrafluoroethane and tetrachlorodifluoroethane.

24. The metod of claim 14 wherein said step of drawing air from said at least one vapor pipe includes disposing said at least one vapor pipe in a subsurface area in the vicinity of said at least one of a plurality of subsurface fluid storage tanks with an air inlet positioned above the surface;

drawing air from the atmosphere above the surface into said inlet of said at least one vapor pipe;

drawing air from said at least one vapor pipe through apertures therein into subsurface material surrounding said at least one of a plurality of subsurface fluid storage tanks;

said drawing further including drawing air from the apertures of said at least one vapor pipe through said subsurface material surrounding said at least one of a plurality of subsurface fluid storage tanks and in relatively close proximity thereto, to apertures of said at least one sample pipe; and said drawing step yet further including drawing the air from the vicinity of said at least one of a plurality of subsurface fluid storage tanks into said at least one sample pipe and out a surface outlet thereof.

25. The method of claim 24 wherein said step of analyzing the air in said at least one sample pipe includes coupling an analyzing device to said outlet of said at least one sample pipe;

drawing at least one sample of air from said sample pipe and into said analyzing device;

removing water vapor from said sample of air taken from said at least one sample pipe; and testing said at least one sample of air from said sample pipe with the water vapor removed and detecting for the presence of said volatile liquid phase tracer for determining the presence of a leak in said at least one of a plurality of subsurface fluid storage tanks.

26. The method of claim 25 wherein the step of removing water vapor from the air sample taken from said outlet of the sample pipe includes feeding the air sample into a water separator tube;

forming an annular space in an area around said water separator tube;

diffusing water vapor in an air sample supplied to said water separator tube through walls thereof into said annular space;

supplying a gas carrier to said annular space;

sweeping away diffused water vapaor using the carrier gas stream in said annular space; and supplying an air sample with the water vapor removed therefrom from an output of said water separator tube into a gas chromatograph for analysis thereof to determine the presence of said tracer and an existence of a leak in said subsurface tank.

27. In a leak detection system for detecting an existence of a leak in at least one of a plurality of underground fluid storage tanks and for locating specific leaks so detected having at least one of a plurality of underground fluid storage tanks and a backfill material surrounding the at least one of a plurality of underground fluid storage tanks, wherein the improvement comprises:

a number of different and distinct volatile liquid phase tracer means, one for each one of said at least one of a plurality of underground fluid storage tanks;

means for mixing a quantity of a different one of said different and distinct volatile liquid phase tracer means with fluid within each one of said at least one of a plurality of underground fluid storage tanks;

at least one underground air inlet pipe means having an above-surface air inlet and a plurality of apertures in an underground portion thereof for supplying atmospheric air to said backfill means, said air inlet pipe means being disposed in said underground backfill means in close proximity to said at least one of a plurality of underground fluid storage tanks;

at least one underground soil gas sample pipe means having an above-surface outlet and a plurality of apertures in an underground portion thereof, said sample pipe means being disposed in said underground backfill means in the vicinity of said at least one of a plurality of fluid storage tanks;

means for drawing atmospheric air into said inlet of said at least one underground air inlet pipe means, through said at least one underground air inlet pipe means, and out apertures thereof into said backfill material, for drawing said air past said at least one of a plurality of underground fluid storage tanks through said backfill material and in relatively close proximity to at said least one of a plurality of underground fluid storage tanks thereby volatilizing leaking liquid phase tracer means to a gas phase tracer means into said air, for drawing an air sample from around said at least one of a plurality of underground fluid storage tanks into apertures of said at least one underground soil gas sammple pipe means and to said outlet thereof; and testing means coupled to said output of said at least one underground soil gas sample pipe means for analyzing said air sample for each of said number of different and distinct volatile liquid phase tracer means for detecting leaks in said at least one of a plurality of underground fluid storage tanks, a particular gas phase tracer means detected identifying the at least one of a plurality of fluid storage tanks having leaks.

28. The system of claim 27 wherein said backfill material comprises gravel for preventing point pressure from large rocks and and other solid objects and for providing a relatively good air conduit therethrough.

29. The system of claim 27 wherein said backfill material comprises sand for providing a relatively good air conduit therethrough.

30. The system of claim 27 wherein the number of different and distinct volatile liquid phase tracer means is equal to the number of underground fluid storage tanks and one of each of said plurality of different and distinct volatile liquid phase tracer means are mixed with fluids in one and only one of each of said plurality of underground fluid storage tanks.

31. The system of claim 27 wherein said mixing means includes means for mixing a quantity of a different and distinct volatile liquid phase tracer means into fluids destined for each underground fluid storage tank before filling each storage tank with said fluid.

32. The system of claim 27 wherein said mixing means includes means for injecting a quantity of each different and distinct liquid phase tracer means into a correspondingly different and distinct one of each of said underground fluid storage tanks after said tanks have been filled with fluid; and means for mixing each of said injected quantities of volatile liquid phase tracer means throughout the fluids.

33. The system of claim 27 wherein said mixing means includes means for supplying a quantity of each different and distinct volatile liquid phase tracer means into fluid within a different and distinct underground storage tank after said tanks have been filled with said fluid; and recirculation means for mixing said volatile liquid phase tracer means into said fluids.

34. The system of claim 27 wherein said at least one underground air inlet pipe means is disposed on one side of at least a first one of said plurality of underground fluid storage tanks and wherein said at least one underground soil gas sample pipe means is disposed on an opposite side of said first one of said plurality of fluid storage tanks, whereby air drawn down said at least one underground air inlet pipe means passes through the backfill material surrounding said first one of a plurality of fluid storage tanks and said at least one inlet and said at least one underground sample pipe means, and flows through said apertures of said at least one underground sample pipe means for collecting an air sample which contains a unique, different, and distinct gas phase tracer means for identifying a particular tank in the backfill material having a leak.

35. The system of claim 27 wherein said at least one underground air inlet pipe means is disposed on one side of said at least one of a plurality of underground fluid storage tanks and in relatively close proximity thereto, said at least one underground sample pipe means disposed on an opposite side of said at least one of a plurality of underground fluid storage tanks, whereby substantially all air drawn in through said at least one underground air inlet pipe means passes through said backfill material surrounding said at least one of a plurality of underground fluid storage tanks, in close proximity thereto such that said air sample collected by said at least one underground sample pipe means contains one different and distinct gas phase tracer means for each leaking ones of said corresponding different and distinct storage tanks.

36. The system of claim 27 wherein said drawing means includes a pumping means coupled to the outlet of said at least one underground sample pipe means for sucking atmospheric air down said at least one underground air inlet pipe means, through said backfill material around said at least one of a plurality of underground fluid storage tanks, and up said at least one underground sample pipe means.

37. The system of claim 27 wherein said at least one underground air inlet pipe means includes a plurality of underground air inlet pipe means disposed within said backfill material on at least one side of said at least one of a plurality of underground fluid storage tanks, and said at least one underground sample pipe means comprises a single underground soil gas sample pipe operably disposed in said backfill material on an opposite side of said at least one of a plurality of underground fluid storage tanks for serving as a central sample collection point for gathering air samples to be tested.

38. The system of claim 27 wherein said testing means includes gas chromatograph means for vaporizing and testing an air sample and for detecting concentrations of gas phase tracer means contained therein; and a tubular water separator means including an elongated tube connected to said gas chromatograph means, a cylindrical jacket means encasing said elongated tube defining an annular channel between an outer surface of said elongated tube and an inner surface of the jacket means, whereby a gas sample supplied to said gas chromatograph means and then to an inlet of said elongated tube for conduction thereof, passes through said elongated tube diffusing water vapor through walls thereof into the annular channel such that an air sample output from said elongated tube to said gas chromatograph means for detection and concentration measurement of tracer means is free from water vapor to insure more sensitive detection and concentration measurement, said tubular water separator means further includes an inlet means located at one end of said annular channel, a source of carrier gas means connected to said inlet means for supplying said annular channel with carrier gas for collecting water vapor diffused therein from said tube and outlet means at an opposite end of said annular channel for outputing an water vapor and carrier gas.

39. The system of claim 27 wherein said testing means for analyzing the air samples includes a gas chromatograph for detecting the presence of each of said plurality of different and distinct gas phase tracer means and for measuring relative concentration thereof; and a tubular water separator means coupled to said gas chromatograph for receiving the air samples and removing water vapor therefrom prior to transporting the air samples to said gas chromatograph.

40. The system of claim 27 wherein the fluid in said at least one of a plurality of underground storage tanks is a liquid.

41. The system of claim 40 wherein said liquid is gasoline.

42. The system of claim 27 wherein said at least one underground air inlet pipe means includes a plurality of underground air inlet pipe means disposed within said backfill material on one side of said at least one of a plurality of underground fluid storage tanks and said at least one underground sample pipe means includes a plurality of underground sample pipe means disposed within said backfill material on an opposite side of said at least one of a plurality of underground storage tanks whereby, substantially all air drawn from the atmosphere into said plurality of underground air inlet pipe means passes through said backfill means past and in close proximity to each of said at least one of a plurality of underground fluid storage tanks, such that air samples collected by said plurality of underground sample pipe means contain measurable amounts of different and distinct gas phase tracer means from leaking ones of the at least one of a plurality of underground fluid storage tanks.

43. The system of claim 42 wherein said drawing means comprises a plurality of drawing means including at least one for each of said plurality of underground soil gas sample pipe means.

44. The system of claim 27 further including boring means for forming a plurality of test bores in said backfill material in the vicinity of each underground fluid storage tank for which a leak has been detected for tracking and locating a tracer plume in said backfill material; and means for analyzing soil gas samples from each of said plurality of test bores for tracer concentrations is the soil gas samples whereby said tracer plume is located for establishing a source and a location of a leak in said at least one of a plurality of underground fluid storage tanks.

45. The system of claim 44 wherein said means for analyzing the air samples includes a gas chromatograph for detecting the presence of a particular one of said plurality of different and distinct gas phase tracer means and for measuring relative concentrations thereof; and a tubular water separator means coupled to the gas chromatograph for removing water vapor from the air samples prior to analysis thereof.

46. A method of locating leaks in at least one of a plurality of underground fluid storage tanks substantially surrounded by an air-conducting backfill material comprising the steps of:

placing air inlet means into an air-conducting backfill material which surrounds a plurality of underground fluid storage tanks, said air inlet means being disposed on one side of at least one of said plurality of underground fluid storage tanks;

placing sample collection means into said air conducting backfill material on an opposite side of said at least one of a plurality of underground fluid storage tanks;

mixing fluid in said at least one of a plurality of underground fluid storage tanks with a different and distinct one of a plurality of liquid phase tracers;

drawing air into said air inlet means and subsequently into said air conducting backfill material;

volatilizing any liquid phase tracer escaping into said backfill material substantially surrounding said at least one of a plurality of underground fluid storage tanks from a leak in said at least one of a plurality of underground fluid storage tanks into said air drawn into said backfill material, thereby transforming said liquid phase tracer to a gas phase tracer and absorbing said gas phase tracer in said air drawn into and through said backfill material;

collecting at least one air sample from said sample collection means on an opposite side of said at least one of a plurality of storage tanks from the side on which air is drawn into said backfill material; and analyzing said at least one collected air sample to determine a presence of any one of said plurality of different and distinct liquid phase tracers in the gas phase for indicating the existence of a leak in said at least one of a plurality of underground fluid storage tanks.

47. The method of claim 46 wherein the fluid in said at least one of a plurality of underground fluid storage tanks comprises a gasoline.

48. The method of claim 46 wherein said backfill material comprises gravel.

49. The method of claim 46 wherein said backfill material comprises sand.

50. The method of claim 46 wherein the step of mixing the fluid in said at least one of a plurality of underground fluid storage tanks with a different and distinct one of a plurality of liquid phase tracers includes the step of mixing a predetermined quantity of one of said plurality of liquid phase tracers with the fluid prior to transporting the fluid into said at least one of a plurality of underground fluid storage tanks.

51. The method of claim 46 wherein the step of mixing the fluid in said at least one of a plurality of underground fluid storage tanks with a corresponding different and distinct one of a plurality of liquid phase tracers includes mixing said liquid phase tracer throughout the fluid to obtain a relatively uniform fluid tracer mixer throughout said at least one of a plurality of underground fluid storage tanks.

52. The method of claim 46 wherein said liquid phase tracer comprises a fluorinated halocarbon compound.

53. The method of claim 46 further comprising the step of selecting said plurality of tracers from the group consisting of fluorinated halocarbons, methanes, and ethanes.

54. The method of claim 46 further comprising the steps of:

determining from said analysis that said liquid phase tracer is leaking from said at least one of a plurality of underground fluid storage tanks;

detecting a tracer plume at a main collection location; and probing upgradient and measuring concentrations of said gas phase tracer in said drawn soil gas samples along said tracer plume, thereby, locating an exact point of said liquid phase tracer leaking from the at least one of a plurality of underground fluid storage tanks.

55. The method of claim 54 wherein said step of probing further comprises the steps of:

boring a plurality of small diameter holes into said backfill material;

collecting soil gas samples from each of said plurality of small diameter holes;

analyzing each of said collected soil gas samples and determining concentrations of said gas phase tracer in each of said collected soil gas samples; and concurrently drilling and testing said collected soil gas samples upgradient and determining the location of maximum gas phase tracer concentration in said collected soil gas samples and determining the location of said liquid phase tracer leaking from said at least one of a plurality of underground fluid storage tanks.

56. The method of claim 46 wherein the step of mixing the fluid in said at least one of a plurality of underground fluid storage tanks with a different and distinct one of a plurality of volatile liquid phase tracers includes initially supplying the fluid into said at least one of a plurality of underground fluid storage tanks and subsequently adding a predetermined quantity of a given one of said plurality of different and distinct liquid phase tracers thereto.

57. The method of claim 56 wherein said step of mixing the fluid in said at least one of a plurality of underground fluid storage tank with a different and distinct one of a plurality of liquid phase tracers comprises mixing the liquid phase tracer thoroughly into the fluid within the tank in situ.

58. The method of claim 56 wherein the step of mixing further includes the step of recirculating the fluid together with said supplied liquid phase tracer for mixing the two within said at least one of a plurality of underground fluid storage tanks in situ.

59. The method of claim 46 further including the step of selecting said plurality of different and distinct tracers from the group consisting of fluorinated halocarbon;

halogenated methanes, halogenated ethanes sulferhexafluoride, perfluorodecalin, and perfluoro 1,3 dimethylcyclohexane.

60. The method of claim 59, wherein said tracer is a halogenated methane group liquid phase tracer means selected from the group consisting of chlorobromodifluoromethane, triflurolodomethane, trifluorobromomethane, dibromodifluoromehtane, dichlorodifluoromethane and tetrafluoromethane.

61. The method of claim 59, wherein said tracer is a halogenated ethane group liquid phase tracer means selected from the group consisting of dichlorotetrafluoroethane, chloropentafluoroethane, hexafluoroethane, trichlorotrifluoroethane, bromopentafluoroethane, dibromotetrafluoroethane and tetrachlorodiflurorethane.

62. The method of claim 46 wherein the step of mixing further comprises mixing said fluid in each one of said at least one of a plurality of underground fluid storage tanks with a different and distinct one of a plurality of liquid phase tracers;

and wherein said step of absorbing any gas phase tracer further comprises the steps of installing a plurality of air inlet pipes in close proximity to and on one side of said plurality of underground fluid storage tanks drawing air from the atmosphere into at least one of said plurality of air inlet pipes, into said backfill material, drawing said air in close proximity to said at least one of a plurality of underground fluid storage tanks, absorbing any gas phase tracer leaking into said backfill material, collecting said drawn air and detecting any liquid phase tracer, in the gas phase, leaking from any one of said at least one of a plurality of underground fluid storage tanks.

63. The method of claim 62 wherein said step of collecting said drawn air sample further comprises installing a collection pipe on an opposite side of said at least one of a plurality of underground fluid storage tanks from said plurality of air inlet pipes and collecting at least one drawn air sample therefrom.

64. The method of claim 62 wherein said step of absorbing any gas phase tracer further comprises the steps of providing a pump coupled to each of said plurality of collector pipes and pumping air from the atmosphere through said at least one air inlet pipe, through said backfill material surrounding said at least one of a plurality of underground fluid storage tanks, through said sample collection means and collecting drawn air for analysis.

65. The method of claim 64 further comprising the steps of:
determining that said at least one of a plurality of underground fluid storage tanks is leaking;
drilling a plurality of small diameter holes into said backfill material;
collecting soil gas samples by drawing air samples from at least one of said plurality of small diameter holes;
detecting for the presence of any gas phase tracer in said soil gas samples;
drilling additional small diameter holes, in a reverse tracking manner, collecting soil gas samples by drawing air samples from at least one of said additional small diameter holes, detecting for the presence of any gas phase tracer in said drawn soil gas samples from said additional small diameter holes;
tracking the source of liquid phase tracer leaking from at least one of said plurality of underground storage tanks by measuring increased concentrations of said gas phase tracer in said drawn soil gas samples from said at least one of said additional small diameter holes and, thereby, locating a plume of said gas phase tracer in said backfill material; and
determining the source of liquid phase tracer leaking from said at least one of the plurality of underground fluid storage tanks by locating a point where the maximum concentration of said gas phase tracer is detected in said drawn soil gas sample from said additional small diameter holes.

66. The method of claim 46 wherein the fluid in said at least one of a plurality of underground fluid storage tanks comprises a liquid.

67. The method of claim 66 wherein the step of collecting said at least one air sample further comprises the steps of sinking at least one of a plurality of vapor pipes into the backfill material on one side of and in close proximity to the at least one of a plurality of underground fluid storage tanks;
positioning at least one inlet end of said at least one of a plurality of vapor pipes above a surface of said backfill material for serving as an air inlet;
burying substantially an entire remaining portion of said at least one of a plurality of vapor pipes pipe in the backfill material in close proximity to said at least one of a plurality of underground fluid storage tanks;
drawing atmospheric air into said at least one of plurality of vapor pipes, down said at least one of a plurality of vapor pipes and into the backfill material;
distributing said drawn air out of said at least one of a plurality of vapor pipes and into the backfill material;
passing said drawn air in relatively close proximity to said at least one of a plurality of underground fluid storage tanks;
absorbing liquid phase tracer, in the gas phase, escaping from a leak in the at least one of a plurality of underground fluid storage tanks into said drawn air; and
directing said drawn air in said backfill material past the at least one of a plurality of underground fluid storage tanks and through collection location.

68. The method of claim 67 wherein said step of collecting said at least one air sample further includes the steps of:
sinking a collection pipe into said backfill material on an opposite side of and in close proximity to the at least one of a plurality of underground fluid storage tanks;
positioning one end of said sample collection pipe above the backfill material surface to serve as a sample collection output;
raising a drawn air sample collected in said sample collection pipe to said sample collection outlet; and
supplying said raised air sample to a gas chromatograph system for analyzing said raised air sample.

69. The method of claim 68 wherein said step of collecting at least one air sample at the outlet includes:
vaporizing water contained in said at least one air sample;
removing substantially all water vapor from said at least one collected air sample before analysis;

testing said at least one air sample having substantially all water vapor removed therefrom and detecting for any of said plurality of different and distinct liquid phase tracers, in the gas phase; and
determining which of said underground fluid storage tanks is leaking.

70. The method of claim 69 wherein said step of removing substantially all water vapor from said at least one collected air sample before analysis further comprises the steps of:
vaporizing water in said at least one collected air sample into water vapor;
conducting said vaporized sample through an elongated water separator tube;
diffusing said water vapor in said at least one collected air sample through said elongated water separator tube into a surrounding space whereby a remaining portion of said at least one collected air sample is free from water vapor; and
transporting said at least one collected air sample free from water vapor from an output of said elongated water separator tube to a gas chromatograph for analysis.

71. The method of claim 70 wherein said step of removing substantially all water vapor from said at least one collected air sample further comprises the steps of:
supplying a carrier gas under pressure;
directing a flow of said carrier gas along an outside surface of said elongated water separator tube;
absorbing water vapor which diffuses through said elongated water separator tube into said flow of said carrier gas; and
removing said carrier gas and said absorbed water vapor.

* * * * *

UNITED STATES PATENT AND TRADEMARK OFFICE
CERTIFICATE OF CORRECTION

PATENT NO. : 4,725,551

DATED : February 16, 1988

INVENTOR(S) : Glenn Thompson

It is certified that error appears in the above—identified patent and that said Letters Patent is hereby corrected as shown below:

Claim 20, lines 1 and 2, delete "drawiang" and insert therefor --drawing--.

Claim 51, line 6, delete "mixer" and insert therefor -- mixture --.

Signed and Sealed this

Twenty-second Day of November, 1988

Attest:

DONALD J. QUIGG

*Attesting Officer*    *Commissioner of Patents and Trademarks*